United States Patent [19]

Valdemarsson

[11] Patent Number: 4,541,289
[45] Date of Patent: Sep. 17, 1985

[54] TEMPERATURE-COMPENSATED MAGNETOELASTIC FORCE MEASURING MEANS

[75] Inventor: Stefan Valdemarsson, VästerÅs, Sweden

[73] Assignee: ASEA Aktiebolag, Vasteras, Sweden

[21] Appl. No.: 477,370

[22] Filed: Mar. 21, 1983

[30] Foreign Application Priority Data

Mar. 24, 1982 [SE] Sweden ............................. 8201869

[51] Int. Cl.$^4$ ............................................. G01L 1/12
[52] U.S. Cl. ............................. 73/862.69; 73/DIG. 2
[58] Field of Search .............. 73/862.69, DIG. 2, 779, 73/862.63; 324/209; 336/20

[56] References Cited

U.S. PATENT DOCUMENTS

| 2,571,718 | 10/1951 | Howes | 73/862.69 X |
| 3,279,247 | 10/1966 | Hiratsuka | 73/862.69 |
| 3,639,832 | 2/1972 | Goebbels | 73/862.69 X |
| 4,193,294 | 3/1980 | Forslund et al. | 73/862.69 |

Primary Examiner—James L. Rowland
Assistant Examiner—Brian R. Tumm
Attorney, Agent, or Firm—Watson, Cole, Grindle & Watson

[57] ABSTRACT

A magnetoelastic force transducer with temperature-compensated sensitivity is produced by equally exciting a measuring transducer and a reference transducer having cores of the same material and the same design and in good thermal contact. A spring loads the core of the reference transducer with a constant force. The output signal of the reference transducer is rectified in a phase-sensitive rectifier, the output signal of which is compared with a constant reference voltage. The difference signal resulting from this comparison controls the phase position of the control voltage of the rectifier in such a way that the output signal of the rectifier is brought into agreement with the reference voltage. The output signal of the measuring transducer is also rectified in a phase-sensitive rectifier, which is controlled by said control voltage and the output signal of which constitutes the temperature-compensated measured signal. The same phase-sensitive rectifier is preferably used for both signals by switching devices for the input and output connections of the rectifier.

5 Claims, 7 Drawing Figures

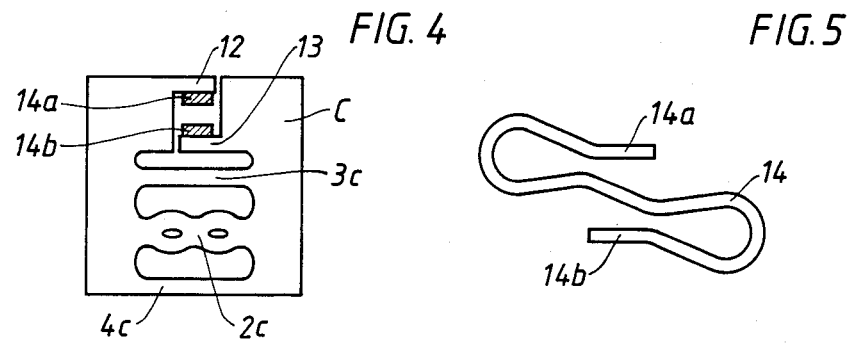
FIG. 4
FIG. 5
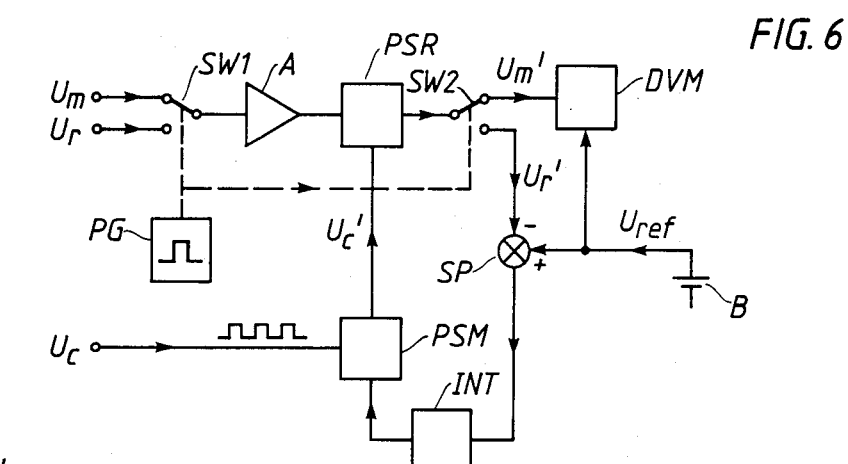
FIG. 6
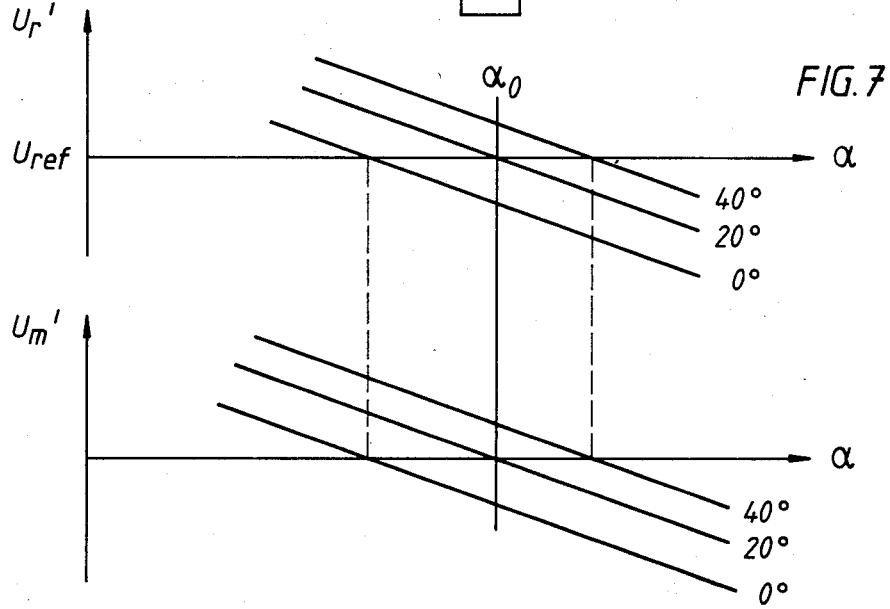
FIG. 7

TEMPERATURE-COMPENSATED MAGNETOELASTIC FORCE MEASURING MEANS

BACKGROUND OF THE INVENTION

1. Field of the Invention

This invention relates to a temperature-compensated magnetoelastic force measuring means, comprising a measuring transducer having a magnetic core with a measuring portion, a means for excitation of the measuring portion, means for producing a force-related output signal from the measuring portion, and signal processing means arranged to generate an output signal of the force measuring means in dependence on the output signal of the measuring transducer.

2. Description of the Prior Art

Magnetoelastic force measuring means are previously known, for example from Swedish Patent Specification 151,267 (also U.S. Pat. No. 2,895,332). These force measuring means comprise a transducer which has a core with an excitation winding, supplied with alternating current, and a measuring winding. The voltage induced in the measuring winding is usually rectified, suitably by means of a phase-sensitive rectifier, and the magnitude of the rectified voltage constitutes a measure of the force applied to the core of the transducer.

OBJECTS OF THE INVENTION

A disadvantage with certain transducers of the abovementioned kind is, however, that the sensitivity is temperature dependent and this makes it difficult or impossible to make measurements with very high precision where a temperature change is possible. The present invention aims to eliminate the temperature dependence of known magnetoelastic force measuring means.

SUMMARY OF THE INVENTION

According to the invention a temperature-compensated magnetoelastic force measuring means comprises a measuring transducer with excitation members and signal processing members. The force measuring means is characterized in that it comprises a reference transducer made of the same material as the measuring transducer, the measuring portion of said reference transducer, possibly with the exception of its thickness, having the same shape and dimensions as the corresponding portion in the measuring transducer. The reference transducer is arranged in a good thermal contact with the measuring transducer in such a way as to ensure temperature conformance between the two transducers. The excitation members are arranged to give the two transducers the same excitation. Spring means is arranged to load the reference transducer with a constant force. A phase-sensitive rectifier is arranged, during a calibrating period, to be supplied with the output signal of the reference transducer for rectifying said signal and with a control voltage. The output signal of the rectifier is arranged to be supplied to an input of a difference generator, the second input of which is arranged to be supplied with a reference voltage from a reference voltage source. The output signal of the difference generator is arranged to be supplied to members arranged to control the output signal of the phase-sensitive rectifier into conformity with the reference voltage by controlling the control voltage. The output signal of the measuring transducer is arranged, during a measuring period, to be supplied to the phase-sensitive rectifier, which is arranged to be controlled by said control voltage and the output signal of which during the measuring period constitutes the temperature-compensated measured value.

BRIEF DESCRIPTION OF THE DRAWINGS

The invention will be described in the following in greater detail and with reference to the accompanying drawings.

FIG. 4 shows a reference transducer required for a measuring means according to the invention, FIG. 5 shows the spring element used in the reference transducer shown in FIG. 4, FIG. 6 shows a signal processing circuit used in a force measuring means according to the invention, and FIG. 7 shows the output signals from the measuring and reference transducers as a function of among other things, the temperature.

DESCRIPTION OF THE PREFERRED EMBODIMENTS

A force measuring transducer according to the invention comprises a measuring transducer (such as those shown in FIGS. 1, 2 and 3) with a reference transducer (such as that shown in FIG. 4).

Figure 1:
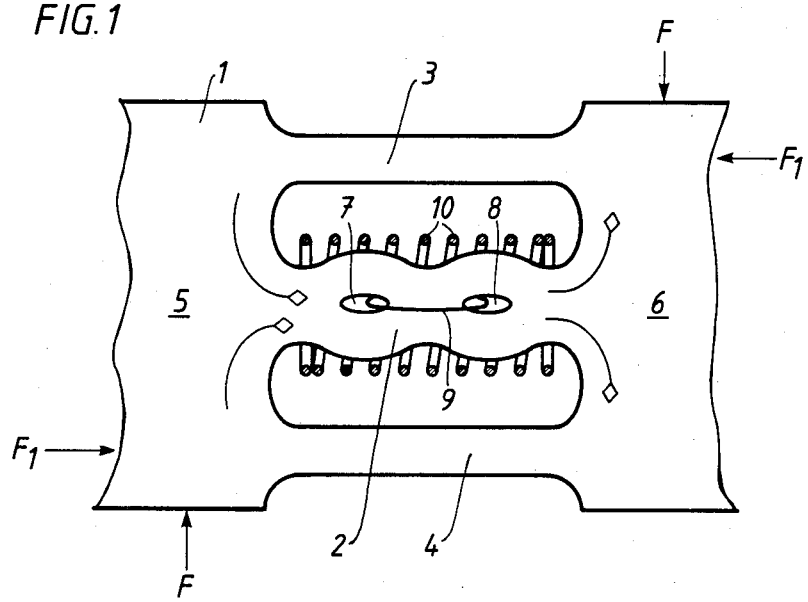
FIG. 1 shows the principle of a force transducer to which the invention may be applied.

FIG. 1 shows a first embodiment of magnetoelastic force transducer suitable for the measuring transducer. It has a laminated or possibly solid core 1 of a suitable magnetic material. The core has two side portions 5 and 6, which are connected to each other by three beams 2, 3, 4. The central beam 2 constitutes the measuring beam and is provided with two holes 7, 8 in which a measuring winding 9 is inserted (for convenience only one turn of the measuring winding 9 is shown in FIG. 1). In the vicinity of the holes 7, 8, the measuring beam 2 is provided with wider portions in such a way that the cross-section of the measuring beam is substantially constant along its entire length. The measuring beam 2 is surrounded by an excitation winding 10 which when supplied with alternating current generates an axial alternating flux through the measuring beam 2. The side portions 5 and 6 and the outer beams 3 and 4 serve as return paths for the flux (indicated by the open headed arrows in FIG. 1). In the unloaded state of the force transducer, equally large portions of the flux passing through the measuring beam 2 will pass respectively below and above each hole 7, 8. No flux will flow through the measuring winding 9 and the output signal of the transducer (the voltage induced in the measuring winding 9) is therefore zero.

When the transducer is loaded with a couple of forces F (and the reaction forces $F_1$) as shown in FIG. 1, the beams 2, 3 and 4 will become deformed and each will acquire a double-curved shape with a point of inflection located in its mid-portion. In the measuring beam 2, tensile stresses arise in the regions above the hole 7 and below the hole 8 and compressive stresses arise in the regions below the hole 7 and above the hole 8. The magnetic resistance of the core material is changed in one direction—for example is reduced—in the case of a tensile stress and in the other direction—is increased—in the case of a compressive stress. Thus, upon loading of the transducer, part of the flux in the measuring beam 2 will now pass through the measuring winding 9 and induce therein an alternating voltage which constitutes the output signal of the transducer. Since the output signal is caused to the same extent by core portions subjected to compressive stresses and by core portions subjected to tensile stresses, the linearity of the output signal—as described in more detail in the specification of U.S. Pat. No. 4,193,294 (granted to Forslund et al on Mar. 18, 1980 and assigned to the assignee of this application) - will be better than if the output signal were to be derived only from regions experiencing compressive stress or only from regions experiencing tensile stress.

In the transducer shown in FIG. 1, the force on the measuring beam 2 in its longitudinal direction thereof is zero. It has been found that by designing the transducer in such a way that the measuring beam 2 is subjected to a force in the longitudinal direction of the beam which is proportional to the force F, it is possible to improve the linearity of the output signal of the transducer further.

Figure 2:
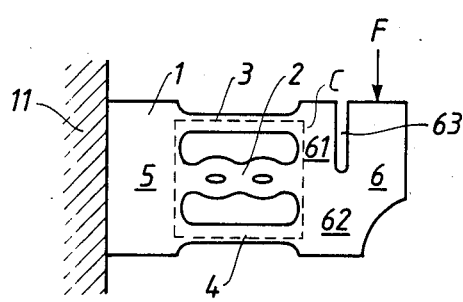
FIG. 2 shows a modification of the transducer shown in FIG. 1, in which the measuring beam is subjected to a tensile stress.

FIG. 2 shows an embodiment in which the righthand side portion of the core 1 is provided with a vertical slot 63. The side portion 6 is thereby divided into two portions, one portion 61 above the measuring beam 2 having smaller width and stiffness than a portion 62 below the measuring beam 2 with greater width and stiffness. In this way, an applied force F will generate a tensile force in the measuring beam 2 which is proportional to the force F. By suitable design and dimensioning, the proportionality constant between the force F and the resultant force acting on the measuring beam 2 may be adjusted so that very good linearity is obtained.

The tranducers described exhibit considerable advantages in relation to other prior art magnetoelastic transducers, namely, 1. a very low zero force signal (the output signal is zero when the applied force is zero),
2. good linearity (the output signal (u) of the transducer follows, with high accuracy, the function U=a constant x F), and
3. negligible creep and hysteresis in the output signal.

Figure 3:
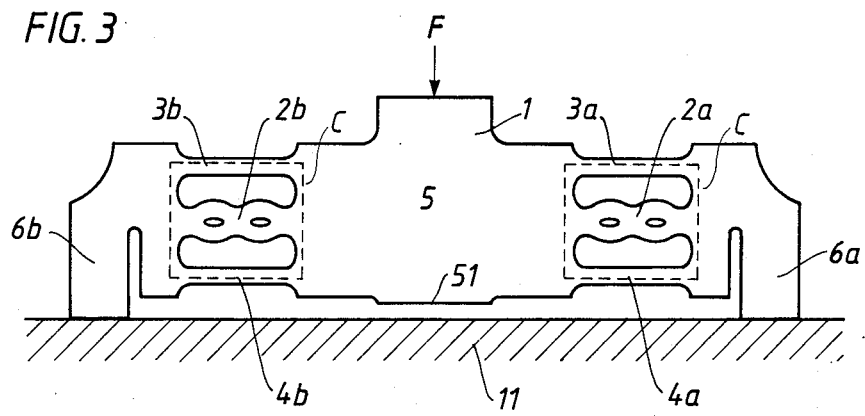
FIG. 3 shows a further modification of the transducer shown in FIG. 1 having two symmetrically arranged measuring portions.

FIG. 3 shows a preferred embodiment of measuring transducer which combines the features already discussed with reference to FIGS. 1 and 2. In FIG. 1 the core 1 is provided with a central portion 5 to which the force F to be measured is applied. On either side of this central portion the core has two identical measuring portions 2a–6a and 2b–6b, respectively, which are constructed in the manner shown in FIGS. 1 and 2 (for the sake of clarity none of the windings are shown in FIG. 3). The force-applying portions 6a and 6b of the measuring portions make contact with a base 11. The mode of operation of the transducer shown in FIG. 3 corresponds to that described with reference to FIGS. 1 and 2. The central portion 5 has a projection 51 arranged at such a distance from the base 11 that, at a certain value of the force F, it will make contact with the base, thus mechanically protecting the transducer against overload.

To produce a transducer according to the invention a measuring transducer is combined with at least one reference transducer C e.g. of the kind shown in FIG. 4.

A schematic indication of the position of the reference transducer is shown in dashed lines in FIG. 2 and 3.

The measuring portion 2c, 3c, 4c of the reference transducer C is exactly the same as each one of the measuring portions of the core 1 in FIG. 3, but in addition it is designed with force application arms 12, 13 so that it can be loaded with a constant force by means of a spring 14 inserted between the arms. To prevent this force from changing with the temperature, the coefficient of elasticity of the material from which the spring 14 is made should be approximately temperature-independent, but preferably with a slight temperature dependence such that the change in elasticity of the spring compensates for the difference in linear expansion between the spring holder and the spring. With a suitable heat treatment, a material of elinvar type can be given just this property.

The reference transducer C is attached to the side of and adjacent to the measuring portion of the measuring transducer, preferably in metallic contact therewith, so as to ensure good temperature conformity without introducing any "shunting" of the force to be measured from the core of the measuring transducer to the core of the reference transducer. The attachment of the reference transducer to the measuring transducer is preferable achieved by means of resilient tubular pins through one of of the lowly stressed side portions 5 or 6 in FIG. 2 of the measuring portions of the reference transducer with a heat conducting spacer of copper or aluminum between the two side portions to allow space for the measuring windings. The cores of both transducers are excited in like manner, for example by series-connecting their excitation windings or by providing the reference and measuring transducers with a common excitation winding, and the two transducers preferably also have similar secondary windings.

Thus, with a measuring transducer as shown in FIG. 2, a single reference transduer C can be employed, whilst with a measuring transducer as shown in FIG. 3, it is desirable to use two reference transducers C, one adjacent to each measuring portion 2a–6a and 2b–6b to ensure the best possible temperature conformity.

For the spring 14 of the reference transducer C to provide a constant force, it is not enough that the material has the above-mentioned temperature properties. In addition, the shape of the spring must be chosen in such a way that the surfaces on the spring which are pressed against the force application surfaces of the core of the reference transducer move in parallel during compression to make possible a good contact with said transducer surfaces and a good force distribution between the different laminations making up the core of the reference transducer. From this viewpoint, a double-curved symmetrical, S-shaped leaf spring having plane and parallel contact surfaces is an ideal solution. To reduce the necessary space for the spring 14 in the reference transducer C, the shape has been compressed vertically into a spring of the shape as shown in FIG. 5. The spring 14 is arranged perpendicularly to the plane of the paper in FIG. 4 and in this Figure only the legs 14a and 14b of the spring 14 are shown in cross-section.

A suitable circuit for the signal processing is shown in FIG. 6. A signal $U_m$ from the measuring transducer and a signal $U_r$ from the reference transducer are alternately connected into an amplifier A with a subsequent phase-sensitive rectifier PSR. The switching is symbolically indicated by a switch SW1. The switch SW1, as well as a linked switch SW2, are controlled by a control device PG in such a way that the reference transducer signal $U_r$ is only connected to the rectifier PSR for a calibrating period of, for example, a few tenths of a second every twentieth second, whereby the rectifier signal $U_r'$ is forwarded via the symbolically shown switch SW2 to the negative input of a difference generator SP. A reference direct voltage $U_{ref}$, from a direct voltage source B, is connected to the positive input of the difference generator SP. The output signal from the difference generator SP is supplied to a control input of a phase shift device PSM via an integrator INT. The phase-shift device PSM is also supplied with a reference alternating voltage $U_c$ having the same frequency as the alternating voltage supplied to the excitation windings of the transducers and with a fixed phase position relative to this alternating winding supply current. The output signal of the integrator INT controls the phase shift in the device PSM and thus the phase angle $\alpha$ of the phase-sensitive rectifier PSR so that the output voltage $U_r'$ of the rectifier becomes equal to $U_{ref}$. Thus, by controlling the phase angle $\alpha$, the resultant signal amplification is adjusted during the calibrating periods in such a way that any temperature dependence of the sensitivity is fully compensated for. When, after each calibrating period, the measuring transducer is switched into the circuit, the integrator INT maintains the phase angle $\alpha$ unchanged. When the measuring portion of the reference transducer—apart from its thickness—is identical to the measuring portion of the measuring transducer, the compensation applies also to the measuring transducer. A prerequisite for this identity is, of course, that the magnetoelastic properties of the sheet material of the cores of the two transducers are equal. To ensure that this is the case, the material should be selected from adjacent portions of the same sheet.

The temperature-compensated measured signal $U_m'$ is finally displayed on a digital voltmeter DVM, which also receives its reference voltage from $U_{ref}$, whereby any small variation of $U_{ref}$ is automatically compensated for in the digital display.

The compensation of the temperature dependence of a transducer according to the invention is illustrated in FIG. 7. After amplification and phase-sensitive rectification with a fixed angle $\alpha_0$ of the two transducer signals $U_m$ and $U_r$, the direct voltages $U_m'$ are obtained, which, like the transducer signals, show a certain temperature dependence - here illustrated for the temperatures 0°, 20° and 40° C. By means of the signal processing equipment described, the phase angle $\alpha$ is changed during the calibrating period so that $U_r'$ becomes equal to the constant reference voltage $U_{ref}$, independently of the temperature of the reference transducer C. Then when the phase angle is held constant during the measuring period, $U_m'$ will also become independent of the temperature, since the temperature of the measuring transducer, due to good thermal contact, is equal to that of the reference transducer C.

Although said invention has sprung from the need to provide temperature compensation for a magnetoelastic measuring transducer, its effect is not limited thereto. Thus, variations in the amplitude and frequency of the supply current are compensated for at the same time and in the same manner as the temperature compensation by the use of a reference transducer.

A further advantage of the compensation method is that the demands on the amplifier A are not at all so extremely severe as regards the stability of sensitivity as is otherwise the case during precision measurement.

Any drift in the sensitivity of the amplifier A will be compensated for in the same way as the temperature dependence of the transducer, and this also applies to the phase sensitive rectifier.

The invention described in the foregoing can be varied in many ways within the scope of the following claims.

What is claimed is:

1. A magnetoelastic force measuring device operating during successive, measuring and calibrating periods and with temperature-compensated sensitivity, comprising:

a measuring transducer having a core with a measuring portion, an excitation winding adapted to be supplied with an alternating power supply, and a measuring winding;

a reference transducer having a core of the same material as said measuring transducer and a measuring portion with an excitation winding and a measuring winding, said reference transducer measuring portion having substantially the same planar shape and dimensions as said measuring transducer;

said reference transducer being mounted in thermal contact with said measuring transducer, the excitation windings of said measuring and reference transducers providing the measuring portions of both transducers with the same excitation;

spring means for loading said reference transducer measuring portion with a constant force;

an amplifier supplied alternatively with the output signal from said reference transducer during the calibration periods and the output signal from said measuring transducer during the measuring periods;

a phase-sensitive rectifier responsive to the output of said amplifier;

means for supplying a phase-shifted control voltage to said phase-sensitive rectifier with the same frequency as the excitation of both the measuring and reference transducers;

a difference generator having a first input receiving the output signal of said rectifier during the calibration periods and generating a difference signal output, and including a second input;

a reference voltage source supplying a reference voltage to said second input;

an integrator for integratiang said difference signal output, the integrated difference signal controlling said phase-sensitive rectifier to equalize the output thereof with said reference voltage, said integrator having a long discharging time compared to a measuring period so that the phase position of the control voltage, obtained during one calibrating period, is maintained for the next measuring period; and switching means for connecting, during the calibrating periods, an output signal of said reference transducer to said amplifier, and simultaneously connecting the rectifier output to said first input, and connecting, during the measuring periods, an output signal of said measuring transducer to said amplifier, and simultaneously connecting said rectifier output to a digital voltmeter for indicating the temperature-compensated value of the force acting on said measuring transducer.

2. A force measuring device as claimed in claim 1, wherein said spring means is a leaf spring within said reference transducer core.

3. A force measuring device as claimed in claim 2, wherein said leaf spring is "S"-shaped with the ends thereof forming parallel contact surfaces pressed against opposing surface portions of said reference transducer core to be compressed with both said ends in alignment with an axis transverse to said measuring portion.

4. The force measuring device as claimed in claim 3, wherein said spring is made of a material having a temperature-dependent modulus of elasticity compensating for the difference in linear expansion between said reference transducer core and said spring.

5. The force measuring device as claimed in claim 4 wherein the material of said spring material is of the elinvar type.

* * * * *